(12) United States Patent
Petterson

(10) Patent No.: US 6,176,200 B1
(45) Date of Patent: Jan. 23, 2001

(54) TEATCUP LINER AND A METHOD OF MANUFACTURING A TEATCUP LINER

(75) Inventor: Torbjörn Karl Ingemar Petterson, Gnesta (SE)

(73) Assignee: Alfa Laval Agri AB, Tumba (SE)

( * ) Notice: Under 35 U.S.C. 154(b), the term of this patent shall be extended for 0 days.

(21) Appl. No.: 09/297,625

(22) PCT Filed: Nov. 4, 1997

(86) PCT No.: PCT/SE97/01845

§ 371 Date: May 4, 1999

§ 102(e) Date: May 4, 1999

(87) PCT Pub. No.: WO98/19519

PCT Pub. Date: May 14, 1998

(30) Foreign Application Priority Data

Nov. 5, 1996 (SE) .................................................. 9604053

(51) Int. Cl.[7] .......................................................... A01J 5/06
(52) U.S. Cl. ......................................................... 119/14.47
(58) Field of Search ............................. 119/14.47, 14.48, 119/14.49, 14.5, 14.51, 14.52, 14.57

(56) References Cited

U.S. PATENT DOCUMENTS

| | | | |
|---|---|---|---|
| 827,160 | * | 7/1906 | Lane . |
| 973,036 | * | 10/1910 | Groff . |
| 1,126,920 | * | 2/1915 | Uebler . |
| 1,236,036 | * | 8/1917 | Anderson . |
| 1,513,189 | * | 10/1924 | Shippert . |
| 2,120,556 | | 6/1938 | Greene . |
| 2,282,159 | | 5/1942 | Berndt . |
| 2,340,295 | * | 2/1944 | Bender . |
| 2,462,583 | * | 2/1949 | Weiby . |
| 2,604,873 | * | 7/1952 | Merritt et al. . |
| 3,324,830 | * | 6/1967 | McAndrew . |
| 3,973,521 | | 8/1976 | Duncan . |
| 4,116,165 | | 9/1978 | Arrington . |
| 4,324,201 | | 4/1982 | Larson . |
| 4,332,215 | | 6/1982 | Larson . |
| 4,372,250 | | 2/1983 | Larson . |
| 4,745,881 | | 5/1988 | Larson . |
| 5,007,378 | * | 4/1991 | Larson ............................... 119/14.47 |
| 6,058,879 | * | 5/2000 | Miefalk .............................. 119/14.47 |

FOREIGN PATENT DOCUMENTS

| | | |
|---|---|---|
| 936724 | 11/1955 | (DE) . |
| 491694 | 9/1938 | (GB) . |

* cited by examiner

Primary Examiner—Michael J. Carone
Assistant Examiner—Jeffrey L. Gellner
(74) Attorney, Agent, or Firm—Hovey, Williams, Timmons & Collins

(57) ABSTRACT

A teatcup liner (1) which is intended for being mounted in a teatcup shell (2) comprises a tubular head portion (4) forming a passage for receiving a teat. The passage extends between a first and a second axial end of the tubular head portion. The tubular head portion has an annular lip (8), which in the mounted as well as the non-mounted state of the teatcup liner (1) extends radially inwardly from the tubular head portion. Furthermore, the teatcup liner comprises a tubular shaft portion (5), which extends from a second axial end (7) of the head portion, and a member (14), which is arranged to provide a radially outwardly directed pretension in the lip in the mounted as well as the non-mounted state of the teatcup liner (1), and is located outside said passage. A method of manufacturing such a teatcup liner comprises the steps of moulding the teatcup liner, expanding the head portion, and providing the pretensioning member.

23 Claims, 5 Drawing Sheets

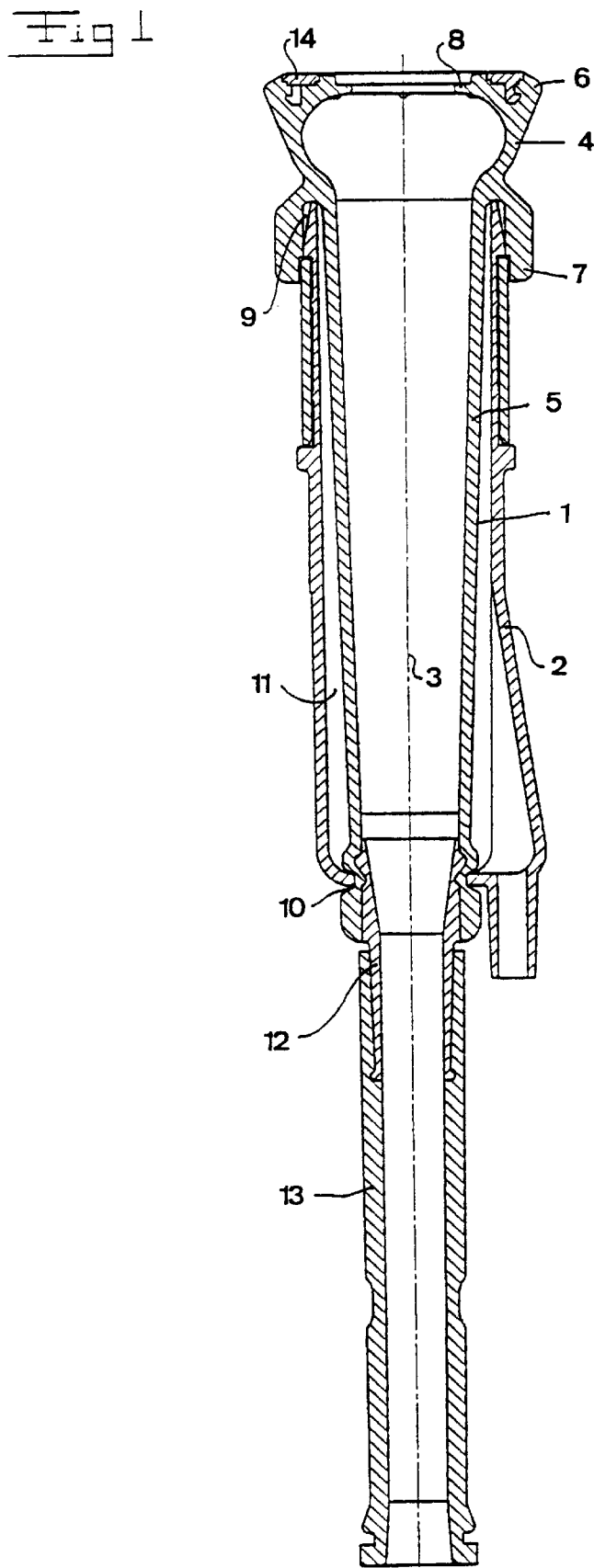

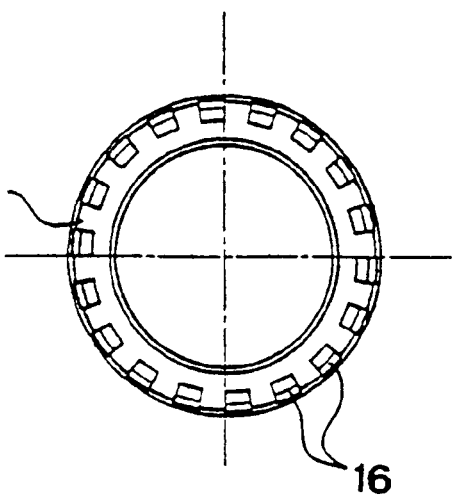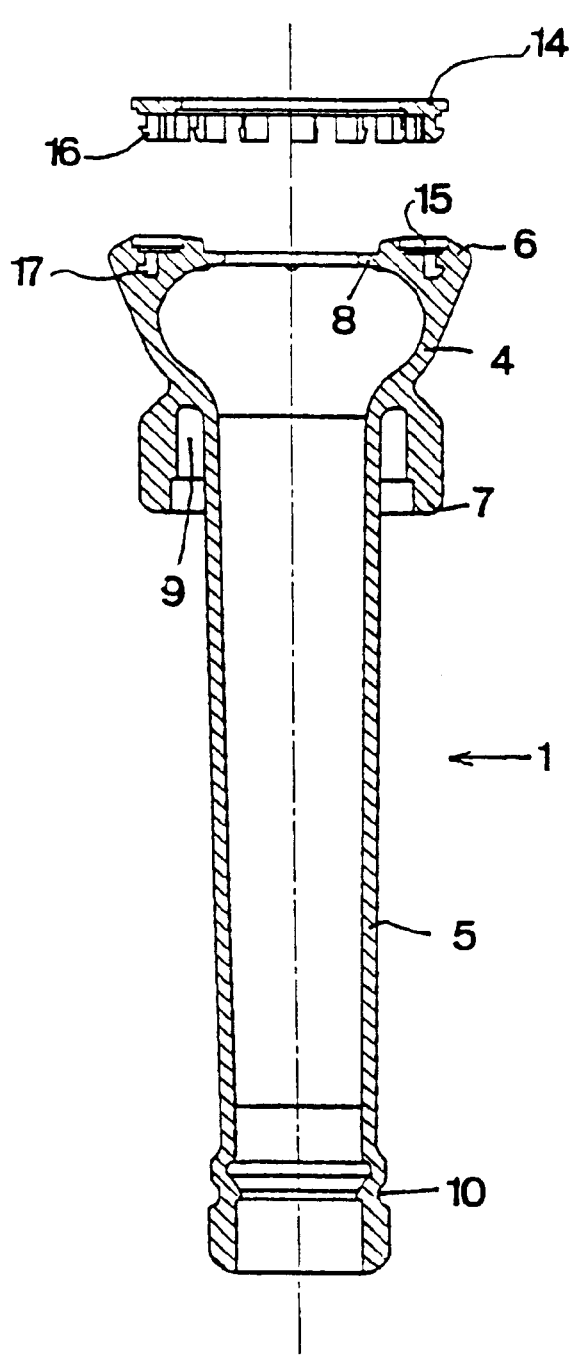

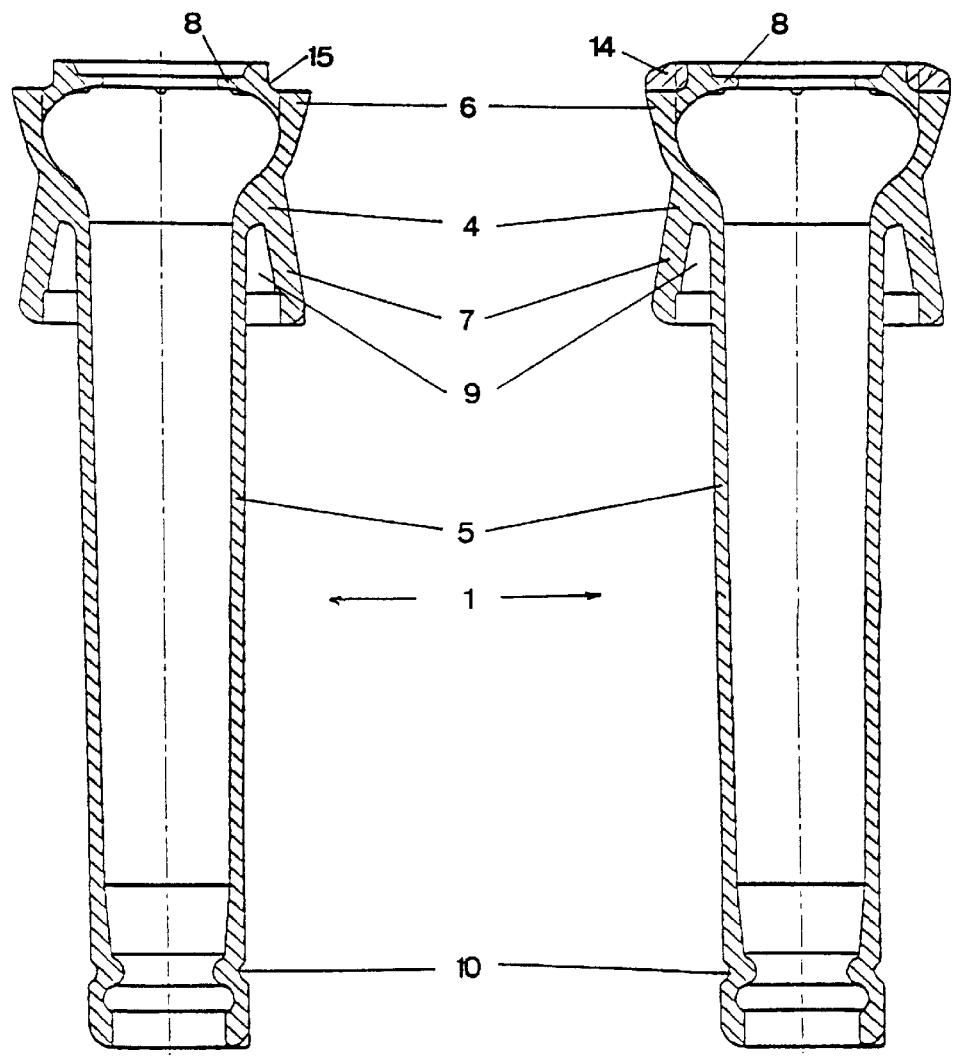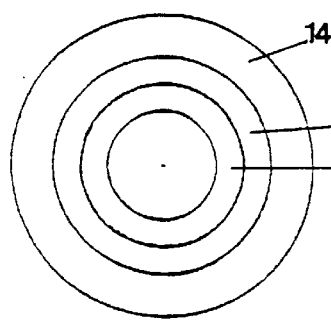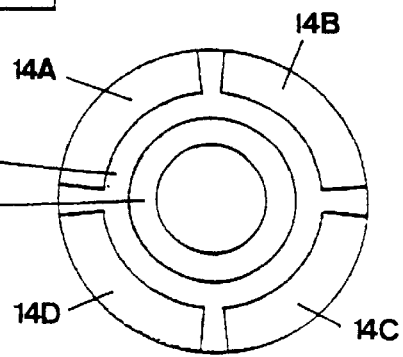

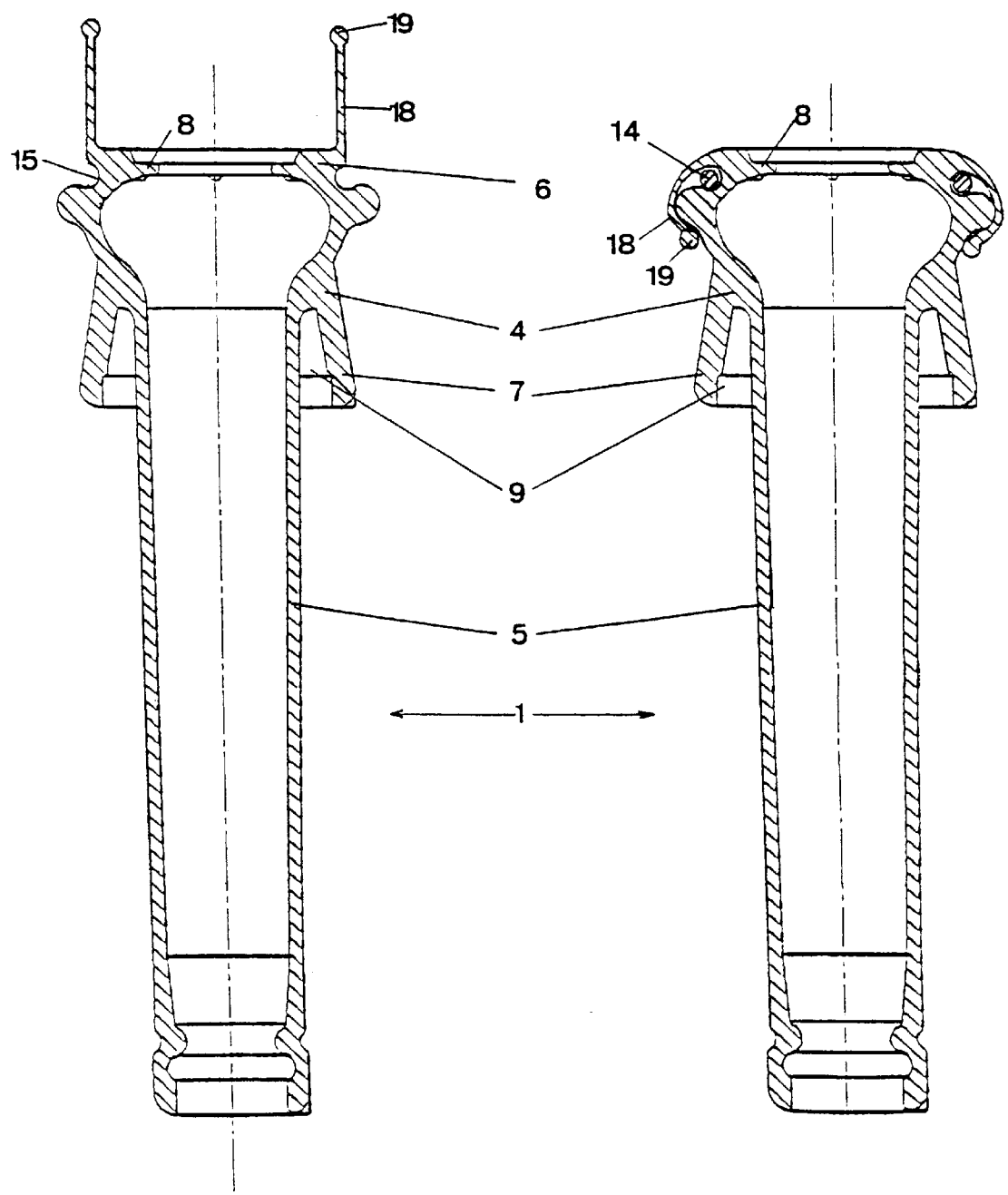

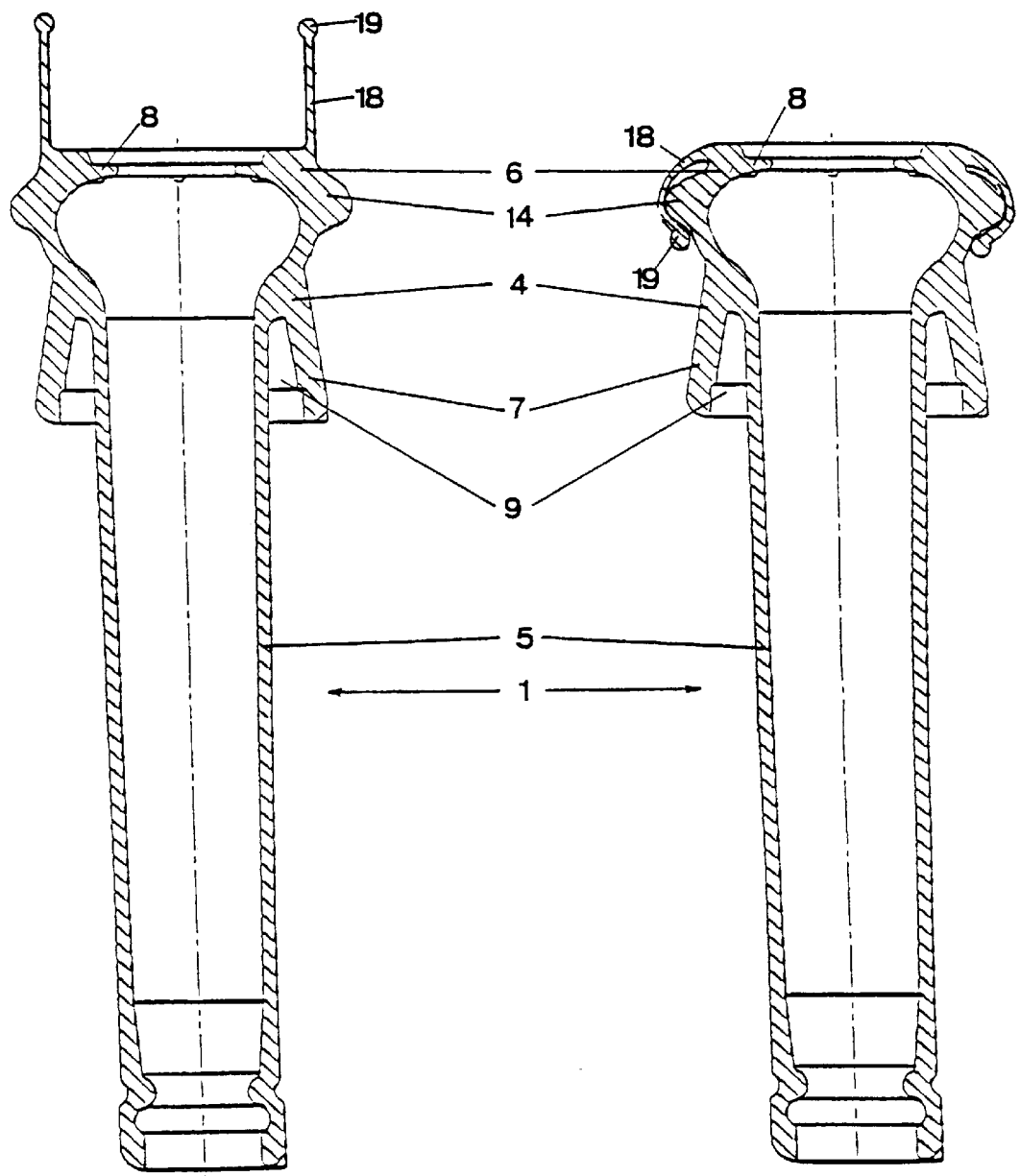

TEATCUP LINER AND A METHOD OF MANUFACTURING A TEATCUP LINER

BACKGROUND OF THE INVENTION

1. Field of the Invention

The present invention refers to a teatcup liner intended for being mounted in a teatcup shell, comprising a tubular head portion, which forms a passage arranged to receive a teat and extending between a first and a second axial end of the tubular head portion, and which comprises an annular lip, extending radially inwardly from the tubular head portion in the mounted as well as the non-mounted state of the teatcup liner, a tubular shaft portion, extending from the second axial end of the head portion, and a member arranged to provide a radially outwardly directed pretension in the lip in the mounted as well as the non-mounted state of the teatcup liner. Moreover, the invention refers to a method of manufacturing a teatcup liner.

2. Description of the Prior Art

U.S. Pat. No. 4,324,201 discloses a type of teatcup liner which comprises a tubular upper part forming a passage for receiving a teat. An annular lip extends radially inwardly from the tubular upper part and defines a circular aperture for the teat. A tubular shaft portion extends downwardly from the upper part to abut the teat being introduced therein. This type of teatcup liner is intended to be mounted in a teatcup shell by simply being introduced therein. In connection with the mounting, no real deformation of the teatcup liner takes place. When the rubber material of such teatcup liners ages, the lip to enclose the teat will be weakened. This means that the teatcup liner already at an initial stage, i.e. when it is applied to the teat, will crawl upwardly on the teat, which may result in a hindering influence to the milk flow. Furthermore, a weakened lip means that the slip frequency, i.e. the inlet suction of air between the teatcup liner and the teat, increases. This type of teatcup liner is also disclosed in U.S. Pat. No. 4,745,881.

U.S. Pat. No. 4,116,165 discloses another type of teatcup liner achieving its effective shape first when it is mounted in a teatcup shell. In its most basic embodiment, this type of teatcup liner merely is comprised by a hose portion. The teatcup liner disclosed comprises in a mounted state a tubular upper part forming a passage for receiving a teat. An annular lip extends radially inwardly from the tubular upper part and defines a circular aperture for the teat. A tubular shaft portion extends downwardly from the upper part to abut the teat. Furthermore, there is a ring, which is arranged to provide a radially outwardly expansion of the upper part and a radially outwardly pretensioning of the lip. This is obtained by the ring, consisting of a separate part, being introduced into the passage in such a manner that the upper part is expanded. Consequently, the pretensioning ring will be located in the passage. Since the separate ring has to be mounted in the teatcup liner when this has been mounted in a teatcup shell, the exchange of the teatcup liner is complicated. Furthermore, the ring provided in the milk passage results in an accumulation of dirt, rest milk, bacteria etc in its area. The gaps and pockets which are formed in the area of the ring are very difficult to keep clean without demounting the whole teatcup and by the cleaning methods normally used for cleaning the milking equipment. U.S. Pat. No. 2,120,556 discloses a somewhat more developed variant of such a hose-like teatcup liner, which has been provided with an expanded part in the upper end.

U.S. Pat. No. 3,973,521 discloses a further type of teatcup liner having a prolongation extending upwardly from the lip and being intended to be folded downwardly over a teatcup shell when the teatcup liner is mounted therein. In such a manner the teatcup liner is fixed in the teatcup shell and simultaneously seals off a pulsating chamber between the shell and the teatcup liner. Furthermore, between the shell and the teatcup liner, a resilient ring member is provided. The ring member, which consists of a separate part which is attached first when the teatcup liner is mounted in the shell, functions to position the teatcup liner in the teatcup shell and to provide a radially outwardly tension of the lip. However, the embodiment disclosed is very complicated and involves a difficult and time-consuming mounting, especially at the conditions prevailing in a stall.

U.S. Pat. No. 2,282,159 discloses a teatcup liner having a head portion and a shaft portion to be introduced into a teatcup shell. The head portion has a first and a second axial end and an annular lip extending radially inwardly from the head portion. According to a first embodiment, a split extension ring is provided in a passage of the head portion on top of the lip. According to a second embodiment, the ring is completely embedded in the rubber material of the head portion. However, at least in this latter case it does not seem possible to obtain a radially outwardly directed pretension of the lip embedded in the rubber material.

This is also the case for the teatcup liner disclosed in GB-A-491 694. This document discloses a similar teatcup liner having a reinforcing ring completely embedded in a thickened outer head portion of the teatcup liner.

SUMMARY OF THE INVENTION

The object of the present invention is to remedy the problems mentioned above and in particular to provide a teatcup liner which easily may be mounted and which has an improved elasticity of the lip. Further object is to provide a method of manufacturing such a teatcup liner.

The first of these objects is obtained by the teatcup liner initially mentioned and characterized in that said pretensioning member is located outside said passage. Such a teatcup liner may in an easy way be mounted in a teatcup shell by merely being introduced therein and pulled into a proper position. No further tools or expanding devices are necessary. Furthermore, such a teatcup liner has a long lifetime with respect to the lip subjected to deformation, since it due to the pretensioning force is more resistant to such deformations. Investigations performed by the applicant have shown that a pretensioned lip results in a higher milk flow in a shorter time period, i.e. a faster and thus more effective milking. The teatcup liner having a pretensioned lip according to the invention seals better against the teat and thus involves less air leakage. Thanks to the provision of the pretensioning member outside the passage through which the milk flows, as proposed by the invention, the teatcup liner is in addition easier to keep clean and accumulation of dirt, rest milk, bacteria and the like in the inner space of the teatcup liner, and in the milk flow passage, may be prevented.

According to an embodiment of the invention, the pretensioning member is located in essentially the same axial position as the lip. In such a manner, essentially the whole expanding force of the pretensioning member will act on the lip.

According to a further embodiment of the invention, the head portion in its second end forms an annular recess which is shaped in such a manner that it, in the mounted state of the teatcup liner, engages the teatcup shell in which the teatcup liner is mounted.

According to a further embodiment of the invention, the pretensioning member is provided in a recess of the first end of the head portion. Thereby, the recess may be open at least in a direction away from the shaft portion. Advantageously, the pretensioning member, by means of attachment means, is fixedly connected to the teatcup liner. The attachment means may comprise portions of the pretensioning member and the teatcup liner which form a melted connection, or hooks projecting from the pretensioning member and arranged to engage the head portion.

According to another embodiment of the invention, the pretensioning member is enclosed in a cavity provided in the first end of the head portion and formed by a collar-like projection foldable around the pretensioning member. Thereby, the collar-like projection may in its outer end comprise an annular thickened portion. In such a manner, the downwardly folded projection will be tightened around the head portion and thus retained in a position.

According to a further embodiment of the invention, the pretensioning member comprises a ring device. This may comprise a closed ring. It may also comprise a plurality of portions provided in a ring configuration and separated from each other. This is advantageous from a manufacturing point of view since an expansion tool introduced in the head portion in that case easily may be removed after mounting of the ring device. Furthermore, the ring device may be formed by a rib extending around the head portion.

According to a further embodiment, the pretensioning member is elastic. This may also be advantageous from a manufacturing point of view.

The object mentioned above is also obtained by a method of manufacturing a teatcup liner comprising the steps:

moulding a teatcup liner with a tubular head portion, which forms a passage arranged to receive a teat and extending between a first and a second axial end of the tubular head portion and which comprises an annular lip extending radially inwardly from the tubular head portion, with a tubular shaft portion extending from the second axial end of the head portion, and with a recess in the first end of the head portion, expanding the head portion, and providing a ring device in the expanded recess.

Advantageous embodiments of the method according to the invention are defined in claims 18–22. The ring device may thus be provided by being manufactured separately and thereafter introduced into the expanded recess. The ring device may also be provided by injection of a material in the expanded recess and by melting said material together with the head portion.

BRIEF DESCRIPTION OF THE DRAWINGS

The present invention is now to be explained more closely by means of different embodiments and with reference to the drawings attached.

FIG. 1 discloses a sectional view of a teatcup having a teatcup liner according to an embodiment of the invention.

FIG. 2 discloses a sectional view of the teatcup liner in FIG. 1, a pretensioning member of the teatcup liner being disclosed separately.

FIG. 3 discloses a view from beneath of the pretensioning member in FIG. 2.

FIG. 4 discloses a sectional view of a teatcup liner without a pretensioning member according to another embodiment of the invention.

FIG. 5 discloses a sectional view of the teatcup liner in FIG. 4 with a pretensioning member.

FIG. 6 discloses a view from above of the teatcup liner in FIG. 5.

FIG. 7 discloses a view similar to the one in FIG. 6 of a teatcup liner having a pretensioning member alternatively shaped.

FIG. 8 discloses a sectional view of a teatcup liner without a pretensioning member according to another embodiment of the invention.

FIG. 9 discloses a sectional view of the teatcup liner in FIG. 8 with a pretensioning member.

FIG. 10 discloses a sectional view of a teatcup liner in a non-pretensioned state according to a further embodiment of the invention.

FIG. 11 discloses a sectional view of the teatcup liner in FIG. 10 in a pretensioned state.

DETAILED DESCRIPTION OF DIFFERENT EMBODIMENTS

With reference to FIGS. 1–3, a teatcup is disclosed with a teatcup liner 1 which is provided in a teatcup shell 2. The teatcup liner 1 is essentially rotationally symmetrical with respect to a longitudinal axis 3 and comprises an upper tubular head portion 4 and a tubular shaft portion 5 extending downwardly from the head portion 4. The head portion 4 comprises a first upper end 6 and a second lower end 7. Beneath the upper end 6, the tubular head portion 4 comprises a lip 8 extending radially inwardly and defining an essentially circular central opening. The tubular head portion 4 forms a passage between the first end 6 and the second end 7 to the inner space of the teatcup liner for receiving a teat. The lower end 7 comprises an annular recess 9 which is engaged by the upper end portion of the teatcup shell 2. The lower part of the shaft portion 5 comprises a peripheral surrounding recess 10 which is engaged by the lower end portion of the teatcup shell 2. The recesses 9 and 10 are shaped in such a manner that a closed space 11 is formed between the teatcup liner and the teatcup shell 2, which space 11 forms a pulsating chamber of the teatcup. In its lower part, the teatcup liner 1 connects to prolongation pieces 12 and 13, which form a milk conduit which may be connected to a claw (not disclosed). The teatcup liner 1 is manufactured in an elastic material, for instance natural or synthetic rubber or any elastic plastic material. In the upper end 6 of the head portion 4 there is a pretensioning member 14 in the shape of a ring, the function of which is to pretension or tighten the upper end 6 of the head portion 4 radially outwardly and in such a manner pull the lip 8 radially outwardly and thus provide a pretension in the lip 8 which extends in the peripheral direction of the lip. In such a manner, weakening of the lip and any deformation, i.e. such as bending upwardly or downwardly of especially radially inner parts thereof is counteracted.

The pretensioning member 14 disclosed is now to be explained more closely with reference to FIG. 2 which discloses the teatcup liner 1 removed from the teatcup shell 2 and the pretensioning member 14 removed from the teatcup liner 1. It is to be noted that when the teatcup liner I and the pretensioning member 14 are separated from each other, as is disclosed in FIG. 2, the diameter of the pretensioning member 14 is in reality greater than the diameter of a recess 15 in the upper end 6 of the head portion 4 for receiving the pretensioning member 14. The pretensioning member 14 according to this embodiment comprises a plurality of hooks 16 extending downwardly on the lower side of the ring and having hook ends turned radially outwardly, see FIGS. 2 and 3. The circular recess 15 has a corresponding shape with depressions 17, which each is arranged to receive and retain a hook 16. By this embodiment it is ensured that the pretensioning member 14 may be fixed securely and stable in the teatcup liner 1. The real radial tensioning force is provided by the hooks 16 of the pretensioning member 14, which extend downwardly from the ring and are located at the same axial level as the lip 8. Thanks to the hooks 16 being located in the peripheral direction at a distance from each other and the depressions, in the same way, being located at a distance from each other in the peripheral direction, there is a connection between a radially inner part and a radially outer part of the upper end 6 of the head portion 4. In such a manner these inner and outer parts are kept together and thus it is effectively prevented that a gap or a slit may arise between the pretensioning member 14 and the teatcup liner 1.

The teatcup liner disclosed in FIGS. 1–3 may be manufactured by first being moulded, preferably by means of injection-moulding, and then vulcanized. Thereafter the head portion 4 is expanded for instance by means of an expansion tool (not disclosed). The expansion may amount to about 1–20%, preferably 5–15%. Thereafter, the ring 14 provided with hooks 16 is introduced into the recess 15 in such a manner that each hook 16 engages a respective depression 17. Thereafter, the expansion force is removed. The teatcup liner 1 is now complete and ready for delivery to a user. The user may now without any difficulty mount the teatcup liner 1 in a teatcup shell 2 by simply inserting the teatcup liner 1 from above into the teatcup shell 2 and pull the teatcup liner 1 until its recesses 9 and 10 are in engagement with the teatcup shell 2.

FIGS. 4–6 disclose another embodiment of the teatcup liner 1 according to the invention. It is to be noted that elements or parts having a corresponding function have been given the same reference signs in the different embodiments. Also, according to this embodiment, the pretensioning member 14 comprises a ring which is provided in an essentially circular recess 15 in the upper part 6 of the head portion 4. The recess 15 is, which appears from FIG. 4, open upwardly as well as radially outwardly. The ring 14 is connected to the radially inner limiting wall and the lower limiting wall of the recess 15. The teatcup liner disclosed in FIGS. 4–6 may be manufactured by first being moulded, as in the first embodiment and at least partly vulcanized. Thereafter, the head portion is expanded, for instance by means of an expansion tool (not disclosed), and the teatcup liner 1 is provided in another mould which is shaped in such a manner that a closed cavity is formed around the recess 15 having a shape corresponding to the ring 14. Thereafter, a suitable material, for instance a thermoplastic material, is injected into the cavity so formed and this material is melted together or vulcanized with the teatcup liner 1. Thereafter, the expansion force is removed. However, the ring 14 in FIGS. 4–6 may also be a preproduced ring, for instance of any metal or metal alloy, which is positioned in the expanded recess 15 and vulcanized therein. Also other attachment methods than vulcanizing may be used, for instance glueing. The teatcup liner 1 manufactured in any of these ways may thereafter be mounted in a teatcup shell 2 in the same way as the teatcup liner 1 disclosed in FIGS. 1–3.

FIG. 7 discloses a variant of this embodiment where the ring 14 is divided into different portions 14A, 14B, 14C and 14D, which are provided in such a manner that they form a ring configuration. Between two adjacent portions, an elastic material extends radially outwardly, which for instance may be the same material as in the upper part 6 of the head portion 4. This embodiment is advantageous due to the fact that it is elastic in a direction radially outwardly, which means that an expansion tool which is introduced into the head portion 4 during the provision of the pretensioning member 14 in an easy way may be removed. It is to be noted that also the pretensioning member 14 which is disclosed in FIGS. 1–3 may be shaped in this way, i.e. with a plurality of different ring portions. It is also to be noted that the number of such portions may be less or more than four as disclosed.

FIGS. 8 and 9 disclose a further embodiment of the invention. Herein, the teatcup liner 1 comprises a collar-like projection 18 which extends upwardly from the upper end 6 of the head portion 4. The projection 18 comprises at its outer end a circular thickened portion 19. The projection 18 and the thickened portion 19 are formed by the same elastic material as the rest of the teatcup liner 1. Radially outside the projection 18, a circular recess 15 is provided. Such a teatcup liner 1 disclosed in FIG. 8 may be moulded and vulcanized, whereafter a pretensioning member 14 in the shape of a ring, preferably of plastic or metal, is introduced into the recess 15. Thereafter the collar-like projection 18 is folded downwardly over the recess 15 in such a manner that the ring 14 is enclosed in a cavity formed by the recess 15 and the collar-like projection 18. Beneath the recess 15, the outer surface of the head portion 4 extends somewhat radially inwardly and the collar-like projection 18 has such a length that the thickened portion 19 will tighten the collar-like projection 18 into this radially inwardly directed part of the outer surface of the head portion 4. In this manner the pretensioning member 14 is securely fixed in the teatcup liner 1 and this may now be mounted in a teatcup shell 2 in the same way as the previously disclosed embodiments. It is also to be noted that the pretensioning member 14 disclosed in this latter embodiment may be divided into different portions as is disclosed in FIG. 7. Such a pretensioning member 14 may comprise ring portions of for instance metal, which are connected to each other by vulcanizing via intermediate ring portions of any rubber material.

FIGS. 10 and 12 disclose a further embodiment which is similar to the one in FIGS. 8 and 9 but where the pretensioning member 14 comprises an annular thickened portion or rib formed by the material of the head portion 4. Thus, the ring device of the pretensioning member 14 is an integrated part of the head portion 4. In order to tighten the lip 8 the collar-like projection 18 is folded downwardly over the annular thickened portion of material 14 in a corresponding way as disclosed in connection with the description concerning FIGS. 8 and 9.

The present invention is not limited to the embodiments disclosed above but may be varied and modified within the scope of the following claims. Although the pretensioning member 14 and the recess 15 have been disclosed having an essentially circular shape, other shapes deviating from the circular shape are possible, for instance oval. It is also to be noted that the teatcup shell 2 and the teatcup liner 1 may have another than a circular cross-section shape.

I claim:

1. A teatcup liner intended for being mounted in a teatcup shell comprising:

a tubular head portion, which forms a passage arranged to receive a teat and extending between a first and a second axial end of the tubular head portion, and which comprises an annular lip for abutting the teat, extending radially inwardly from the tubular head portion in a mounted as well as a non-mounted state of the teatcup liner;

a tubular shaft portion, extending from the second axial end of the head portion; and a member arranged to provide a radially outwardly directed pretension of the lip in the mounted as well as the non-mounted state of the teatcup liner, wherein said pretensioning member is located outside said passage on an outer surface of the head portion.

2. A teatcup liner according to claim 1, wherein the pretensioning member is located in essentially the same axial position as the lip.

3. A teatcup liner according to claim 1, wherein the head portion in its second end forms an annular recess which is shaped in such a manner that it, in the mounted state of the teatcup liner, engages the teatcup in which the teatcup liner is mounted.

4. A teatcup liner according to claim 1, wherein the pretensioning member is provided in a recess of the first end of the head portion.

5. A teatcup liner according to claim 4, wherein the recess of the first end of the head portion is open at least in a direction away from the shaft portion.

6. A teatcup liner according to claim 1, wherein the pretensioning member, is fixedly connected to the teatcup liner by means of attachment means.

7. A teatcup liner according to claim 6, wherein the attachment means comprise portions of the pretensioning member and the teatcup liner, which form a melted connection.

8. A teatcup liner according to claim 6, wherein the attachment means comprise hooks projecting from the pretensioning member and arranged to engage the head portion.

9. A teatcup liner according to claim 1, wherein the pretensioning member is enclosed by a collar-like projection foldable around the pretensioning member.

10. A teatcup liner according to claim 9, wherein the collar-like projection is its outer end comprises an annular, thickened portion.

11. A teatcup liner according to claim 9, wherein the pretensioning member is enclosed in a cavity provided in the head portion and defined by said collar-like projection.

12. A teatcup liner according to claim 1, wherein the pretensioning member comprises a ring device.

13. A teatcup liner according to claim 12, wherein the ring device comprises a closed ring.

14. A teatcup liner according to claim 12, wherein the ring device comprises a plurality of portions provided in a ring configuration and separated from each other.

15. A teatcup liner according to claim 12, wherein the ring device is formed by a rib extending around the head portion.

16. A teatcup liner according to claim 1, wherein the pretensioning member is elastic.

17. A method of manufacturing a teatcup liner comprising the steps of:

moulding a teatcup liner with a tubular head portion, which forms a passage arranged to receive a teat and extending between a first and a second axial end of the tubular head portion and which comprises an annular lip extending radially inwardly from the tubular head portion and, with a tubular shaft portion extending from the second axial end of the head portion, and with a recess in the first end of the head portion, expanding the head portion, and providing a ring device in the expanded recess.

18. A method according to claim 17, wherein after said moulding step the teatcup liner is at least partly vulcanized.

19. A method according to claim 18, wherein the ring device is connected to the teatcup liner by being melted together therewith.

20. A method according to claim 17, wherein the ring device is manufactured separately and provided by being introduced into the expanded recess.

21. A method according to claim 17, wherein the ring device is provided by injection of a material in the expanded recess and by melting together said material with the head portion.

22. A method according to claim 17, wherein the head portion is expanded about 1–20%.

23. A method according to claim 17, wherein the head portion is expanded about 5–15%.

* * * * *